Patented Oct. 28, 1952

2,615,926

UNITED STATES PATENT OFFICE 2,615,926

PROCESS FOR PREPARING ORGANIC COMPOUNDS CONTAINING FLUORINE

Anthony F. Benning, Woodstown, and Edmond G. Young, Clarksboro, N. J., assignors to E. I. du Pont de Nemours & Company, Wilmington, Del., a corporation of Delaware No Drawing. Application March 9, 1949, Serial No. 80,564

2 Claims. (Cl. 260—653)

This invention relates to a process for preparing organic compounds containing fluorine and particularly to a non-catalytic process for converting saturated fluorochlorocarbons to fluorine-containing unsaturated compounds and other valuable products.

Olefins, containing large amounts of fluorine, have proven to be very valuable as intermediates for making high molecular weight polymers of outstanding chemical and thermal stability. Olefines of this character, which are particularly valuable, are $-CF_2=CF_2$ and $CFCl=CF_2$.

An early method of making olefines of this character involved the elimination of 2 chlorine atoms or 2 bromine atoms, located on adjacent carbon atoms, by treatment with zinc and an alcohol. This process is expensive to operate and consumes relatively large amounts of zinc. Furthermore, the starting chlorofluoroalkanes and bromofluoroalkanes are often difficult to obtain and hence expensive.

More recently, Downing, Benning and McHarness have found that some of such olefines can be made by the simple pyrolysis of compounds containing hydrogen and chlorine, as well as fluorine, whereby intra-molecular and inter-molecular dehydrochlorination of the starting compounds takes place. This process is disclosed in Patents 2,384,821, 2,387,247, 2,413,695 and 2,413,696 and in an application Serial No. 632,116, filed November 30, 1945, by Downing, Benning and McHarness, now Patent No. 2,551,573, issued May 8, 1951, and in the article by Park et al. on "Synthesis of Tetrafluoroethylene," appearing on pages 354 to 358 of Industrial and Engineering Chemistry, vol. 39, No. 3, March 1947. This process gives excellent yields, but requires starting materials containing hydrogen. This is sometimes a disadvantage because some of such starting materials, such as $CHClF_2$, are relatively expensive and must be prepared from relatively expensive materials.

C. A. Bordner, in an application, Serial No. 19,172, filed April 5, 1948, discloses a process for preparing fluorine-containing olefines from chlorofluoroalkanes containing at least 2 chlorine atoms, by passing the chlorofluoroalkane with hydrogen over metallic copper as a catalyst at an elevated temperature. At least in certain instances, this process still leaves something to be desired. For example, in order to obtain $CF_2=CF_2$, it is necessary to start with the relatively expensive $CClF_2-CClF_2$, whereas, it would be much preferable to start with a less expensive 1-carbon molecule containing no hydrogen. Furthermore, if the temperatures employed are sufficiently high to give an efficient rate of production, the catalyst causes the formation of considerable amounts of undesirable by-products.

It is an object of our invention to provide a new and improved process for converting saturated fluorochlorocarbons to fluorine-containing unsaturated compounds and other valuable products. Another and particular object is to provide such a process which does not require a catalyst and which, therefore, avoids the expense and other undesirable features of catalytic processes. A preferred object is to provide a method for producing $CF_2=CF_2$ from a cheaper starting material and by a cheaper and more efficient method. A further object is to provide a simple and economical method, whereby compounds, such as $CHF_2-CHF_2$, $CHF_2-CF_3$ and $CHF_2-CClF_2$, can be easily prepared. Other objects are to advance the art. Still other objects will appear hereinafter.

The above and other objects may be accomplished in accordance with our invention which comprises passing vapors of a saturated fluorochlorocarbon, containing 1 to 4 carbon atoms, at least as many fluorine atoms as carbon atoms and at least 2 chlorine atoms, two of the chlorine atoms being separated by 1 to 2 carbon atoms, together with a substantially equimolecular proportion of hydrogen through an inert tube heated to a temperature of from about 650° C. to about 800° C. while avoiding contact of the hot vapors with catalytic materials, and separating the product. We have found that, by such process, we are able to efficiently convert the saturated fluorochlorocarbons to fluorine-containing olefines and other valuable products. Some of such other products may be readily converted to fluorine-containing olefines by known methods or by treating in accordance with this invention and are also valuable for other purposes, such as refrigerants, heat transfer media, solvents and the like. Furthermore, reactions take place which could not be caused to take place by other known methods. Still further, some of the products obtained by our process could not be obtained heretofore, except with difficulty, and by more expensive methods.

The term "fluorochlorocarbon" is employed in its strict technical sense to mean compounds which consist of fluorine, chlorine and carbon. The starting fluorochlorocarbons are saturated, that is, they do not contain any multiple bonds. The saturated fluorochlorocarbons, which are to be employed in accordance with our invention, contain 1 to 4 carbon atoms, at least as many fluorine atoms as carbon atoms and at least 2 chlorine atoms, that is, the number of fluorine atoms in each molecule must be at least equal to the number of carbon atoms and the total of fluorine atoms and chlorine atoms must be sufficient to produce saturated compounds. It is essential that two of the chlorine atoms be separated by 1 to 2 carbon atoms, that is, that they be attached to the same or adjacent carbon atoms. The preferred saturated fluorochlorocarbons contain only 2 chlorine atoms and otherwise consist of carbon and fluorine. We particularly prefer to employ the compounds of the formula $C_nF_{2n}Cl_2$, wherein n equals 1 to 4 and the chlorine atoms are separated by 1 to 2 carbon atoms. Especially desirable results have been obtained by the treatment of $CCl_2F_2$, $ClF_2$—$CClF_2$ and

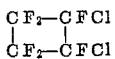

Other saturated fluorochlorocarbons, which may be treated in accordance with our invention, are:

$CCl_3F$
$CCl_2F$—$CClF_2$
$CCl_2F$—$CCl_2F$
$CF_3$—$CCl_3$
$CF_2Cl$—$CCl_3$
$CF_3$—$CCl_2F$
$CF_3$—$CF_2$—$CCl_2F$
$CF_3$—$CClF$—$CClF_2$
$CF_3$—$CCl_2$—$CF_3$
$CF_3$—$CF_2$—$CCl_3$
$CF_3$—$CFCl$—$CFCl_2$
$CF_2Cl$—$CFCl$—$CF_2Cl$
$CF_3$—$CCl_2$—$CF_2Cl$
$CF_3$—$CFCl$—$CCl_3$
$CF_3$—$CCl_2$—$CFCl_2$
$CF_2Cl$—$CCl_2$—$CF_2Cl$
$CF_2Cl$—$CFCl$—$CFCl_2$
$CF_3$—$CCl_2$—$CCl_3$
$CF_2Cl$—$CFCl$—$CCl_3$
$CF_2Cl$—$CCl_2$—$CFCl_2$
$CFCl_2$—$CFCl$—$CFCl_2$
$CF_3$—$CF_2$—$CF_2$—$CCl_2F$
$CF_3$—$CF_2$—$CClF$—$CClF_2$
$CF_3$—$CF_2$—$CCl_2$—$CF_3$
$CF_3$—$CClF$—$CClF$—$CF_3$

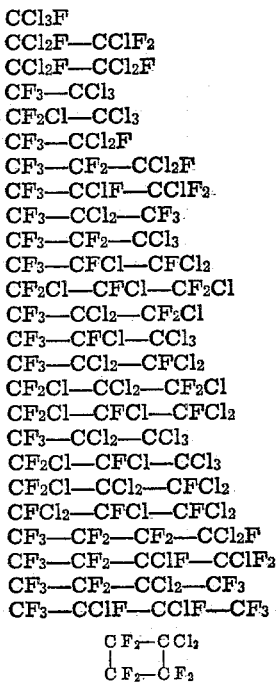

The saturated fluorochlorocarbons will be passed through the reaction tube together with a substantially equimolecular proportion of hydrogen. Materially smaller proportions of hydrogen result in decrease in conversions and yields of the usaturated compounds. Also, large excesses of hydrogen tend to cause hydrogenation of the unsaturated products resulting in lower conversions and yields of the unsaturated products.

The reaction tube will be heated to temperatures of from about 650° C. to about 800° C. It will be understood that all reaction temperatures mentioned herein are those obtained in the usual manner in this type of operation, i. e., "skin temperatures" obtained by placing a thermocouple in direct contact with the outer wall of the tube midway of the heated zone and protected from the source of heat. At temperatures materially below 650° C., the conversion is too low to be practicable and temperatures below 550° C. are generally inoperative. Temperatures materially above 800° C. generally cause extensive decomposition with the formation of large amounts of carbon, tars and resins which deposit in the exit end of the tube and in the collecting apparatus. Optimum conversions and yields of unsaturated compounds are generally obtained at temperatures of from about 675° C. to about 700° C., particularly at contact times of about 1 second.

Contact times, as calculated herein, are based on the time the reactant gases spend in that portion of the tube that is within 100° C. of the temperature indicated for the operation. In our process, the contact times will generally be within the range of from about 0.5 second to about 5 seconds. Preferably, we employ a contact time of about 1 second. It is well known that contact times, in this type of operation, will bear an inverse relationship to the temperature; that is, longer contact times at the lower temperatures will be equivalent to shorter contact times at the higher temperatures and an increase in contact time will be generally equivalent to an increase in temperature.

Our process will usually and preferably be carried out at substantially atmospheric pressures, that is, at pressures of from about 1 to about 2 atmospheres absolute. However, higher and lower pressures may be employed which may vary from about ¼ to about 5 atmospheres absolute, but such variations in pressure usually have little or no effect on the results.

We wish to particularly emphasize that our process is a non-catalytic process, that is, it is carried out in the absence of catalytic materials. In order to obtain our results, it is essential that contact of the hot vapors with catalytic materials be avoided. For this reason, the reaction tube must also be inert, that is, must not react with the fluorochlorocarbons, the hydrogen or the reaction products and must not have a catalytic effect on the reactions. So far, we have found only platinum to be inert and to be able to withstand the temperatures employed.

The products of the reaction passing from the reaction tube will usually be scrubbed in caustic solution in order to remove acidic products from the gaseous stream and then passed into a receiver cooled in a dry ice-acetone bath and then into a receiver cooled in a liquid nitrogen bath, so as to condense the organic products from the gas stream. These condensates will usually be combined and then distilled in a low temperature distilling column to separate the desired products.

In order to more clearly illustrate our invention, preferred modes of carrying the same into effect and the advantageous results to be obtained thereby, the following examples are given:

*Example 1*

2.6 gram-moles of $CCl_2F_2$ was fed with 2.6 gram-moles of $H_2$ into a ¾" platinum lined tube 4 feet long heated to 685° C. in a 30" furnace in 1 hr. at a contact time of 1 sec. (15" of the tube length is assumed to be "at temperature").

| Products | g.-Moles | Percent Conversion | Percent Yield |
|---|---|---|---|
| Acidic materials: | | | |
| HCl | 1.31 | 50 | |
| HF | .08 | 3 | |
| Starting material recovered: $CCl_2F_2$ | 1.32 | 51 | |
| Organic products: | | | |
| $CH_2F_2$ | .24 | 9 | .19 |
| $CHClF_2$ | .46 | 18 | 36 |
| $CF_2=CF_2$ | .08 | [1] 6 | [1] 13 |
| $CHF_2CHF_2$ | .09 | [1] 7 | [1] 14 |
| And small amounts of $CHF_3$ and $CClF_3$. | | | |

[1] Based on carbon for carbon equivalence.

The yield of $CF_2=CF_2$ is readily increased by submitting the $CHClF_2$ to pyrolysis in the manner described in the copending application of Downing, Benning and McHarness, S. N. 632,116. The $CH_2F_2$ and $CHF_2CHF_2$ are both useful as refrigerants and the latter compound may, if desired, be used to increase the yield of $CF_2=CF_2$ by chlorination to $CClF_2$—$CHF_2$ and/or $CClF_2CClF_2$. The $CClF_2$—$CHF_2$ may be pyrolyzed directly to $CF_2=CF_2$ while the $CClF_2$—$CClF_2$ may be treated as described in Example 3.

Example 2

0.34 gram-mole of $CCl_2F_2$ was fed with 0.34 gram-mole of $H_2$ into a 5/16" I. D. x 16" long platinum lined tube heated to 750° C. in a 12" furnace in 1 hr. at a contact time of 1 second. (7" of the tube is assumed to be "at temperature".)

| Products | g.-Moles | Percent Conversion | Percent Yield |
|---|---|---|---|
| Acidic materials: | | | |
| HCl | 0.27 | 79 | |
| HF | .01 | 3 | |
| Starting material recovered: $CCl_2F_2$ | .181 | 53 | |
| Organic products: | | | |
| $CH_2F_2$ | .035 | 10 | 23 [1] |
| $CHClF_2$ | .024 | 7 | 15 |
| $CF_2=CF_2$ | .003 | 1 2 | 1 4 |

[1] Based on carbon for carbon equivalence.

It can be seen, from the data obtained, that a temperature of 685° C. is more desirable than 750° C. since the yield of desirable products ($CHClF_2$ and $CF_2=CF_2$) at 685° C. is 49% whereas, at 750° C., it is 19%. This is further borne out by the ratio of $CH_2F_2$, the by-product resulting from a more extensive reaction, to desirable products which is 0.26/1.0 at 685° C. and 1.2/1.0 at 750° C.

Example 3

0.34 gram-mole of $CClF_2CClF_2$ was fed with 0.34 gram-mole of $H_2$ into a 5/16" I. D. x 16" long platinum line tube heated to 700° C. in a 12" furnace in 1 hr. at a contact time of 1 sec.

| Products | g.-Moles | Percent Conversion | Percent Yield |
|---|---|---|---|
| Acidic materials: | | | |
| HCl | 0.131 | 19 | |
| HF | .003 | 0.4 | |
| Starting material recovered: | | | |
| $CClF_2CClF_2$ | .247 | 73 | |
| Organic products: | | | |
| $CH_2F_2$ | .018 | 1 3 | 1 10 |
| $CHClF_2$ | .017 | 1 3 | 1 9 |
| $CF_2=CF_2$ | .026 | 8 | 28 |
| $CHF_2CHF_2$ | .018 | 5 | 19 |
| $CHF_2CClF_2$ | .010 | 3 | 11 |
| And a small amount of $CHF_3$. | | | |

[1] Based on carbon for carbon equivalence.

Again, in this case, the yield of $CF_2=CF_2$ may be considerably increased by proper treatment of other reaction products as already indicated.

Example 4

0.34 gram-mole of $CClF_2CClF_2$ was fed with 0.34 gram-mole of $H_2$ into a 5/16" I. D. x 16" long platinum lined tube heated to 750° C. in a 12" furnace in 1 hr. at a contact time of 1 sec.

| Products | g.-Moles | Percent Conversion | Percent Yield |
|---|---|---|---|
| Acidic materials: | | | |
| HCl | 0.328 | 48 | |
| HF | .050 | 7 | |
| Starting material recovered: | | | |
| $CClF_2CClF_2$ | .152 | 45 | |
| Organic products: | | | |
| $CHF_3$ | .044 | 1 6 | 1 12 |
| $CH_2F_2$ | .053 | 1 8 | 1 14 |
| $CHClF_2$ | .011 | 1 2 | 1 3 |
| $CF_2=CF_2$ | .016 | 5 | 9 |
| $CHF_2CHF_2$ | .026 | 8 | 14 |
| $CHF_2CClF_2$ | .013 | 4 | 7 |
|  | .016 | 1 9 | 1 17 |
| And small amounts of $CCl_2F_2$ and $CHCl_2F$. | | | |

[1] Based on carbon for carbon equivalence.

It is apparent that the side reactions are promoted by the higher temperature and it is likewise evident that increases in the ratio of $H_2$ to organic will promote by-product formation.

Example 5

0.34 gram-mole of

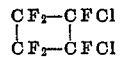

was fed with 0.34 gram-mole of $H_2$ into a platinum lined tube, 5/16" I. D. x 16" long, heated to 675° C. to 680° C. in a 12" furnace in 1 hr. at a contact time of 1 sec.

| Products | g.-Moles | Percent Conversion | Percent Yield |
|---|---|---|---|
| Acidic materials: | | | |
| HCl | 0.062 | 9 | |
| HF | .004 | 1 | |
| Starting material received: | | | |
| $CF_2$–$CFCl$ / $CF_2$–$CFCl$ | .228 | 67 | |
| Organic products: | | | |
| $CF_2=CF_2$ | .030 | 1 4 | 1 13 |
| $CClF=CF_2$ | .137 | 1 19 | 1 57 |
| $CF_2$–$CF$ / $CF_2$–$CF$ | .018 | 5 | 16 |
| Unknown (B. P. –60°) | .014 | 2 | 9 |
| And small amounts of $CHF_3$ and $CHClF_2$. | | | |

[1] Based on carbon for carbon equivalence.

Both the $CF_2=CF_2$ and the $CClF=CF_2$ are valuable for polymerization. The $$\begin{matrix} CF_2-CF \\ | \quad \| \\ CF_2-CF \end{matrix}$$

is of particlular value since it can readily be oxidized to tetrafluorosuccinic acid which is of interest as an intermediate for polyamide condensation products.

Breaking of the ring with increase in the production of open chain compounds tends to increase with increase in the temperature and increase in the contact time. Such breaking of the ring may be decreased by using lower temperatures or shorter contact times or both, but such decrease in temperatures and shortening of contact times also results in a decrease in conversions.

It will be understood that the above examples have been given for illustrative purposes solely and that many variations and modifications may be made therein, within the limits hereinbefore set forth, without departing from the spirit or scope of our invention. For example, the temperatures or the contact times or both may be varied as desired, particularly to vary the relative conversions and yields of the respective products. Also, other saturated fluorochlorocarbons within the class disclosed may be substituted for those in the examples.

Various products obtained are all valuable and useful for a variety of purposes. The unsaturated compounds are particularly valuable for making polymers of outstanding properties. The other products are generally useful as refrigerants and solvents. The unconverted starting materials and the products, which fall within the class of starting materials, may be reprocessed in accordance with our invention. Products such as $CHClF_2$ and $CHF_2$–$CClF_2$ may be pyrolyzed in accordance with the process of Downing, Benning and McHarness, hereinbefore referred to, to produce further amounts of unsaturated products.

Since catalysts are not employed in our process, smaller equipment may be employed for comparable production with considerable economies in operation. Furthermore, the absence of catalysts and catalytic materials avoids the tendency to excessive carbon-carbon bond splitting and loss in yield, whereby it is possible to employ conditions producing higher conversions. Still further, $CF_2=CF_2$ can be made from $CCl_2F_2$ in a single step, which reaction could not be accomplished by previously known methods and does not take place in the process disclosed by Bordner, hereinbefore referred to. Our process also provides a very desirable and economical method for obtaining certain saturated compounds which are more difficult and expensive to prepare by known substitution methods, as illustrated by the formation of $CHF_2—CHF_2$, $CHF_2—CF_3$ and $CHF_2—CClF_2$.

It will thus be apparent that our invention constitutes a valuable improvement in and contribution to the art.

We claim:

1. The process for converting saturated fluorochloro-carbons to fluorine-containing unsaturated compounds and other valuable products which comprises passing vapors of $CCl_2F_2$, together with a substantially equimolecular proportion of hydrogen through an inert tube heated to a temperature of from about 650° C. to about 750° C. while avoiding contact of the hot vapors with catalytic materials, and separating the products.

2. The process for converting saturated fluorochloro-carbons to fluorine-containing unsaturated compounds and other valuable products which comprises passing vapors of $CCl_2F_2$ together with a substantially equimolecular proportion of hydrogen through an inert tube heated to a temperature of from about 675° C. to about 700° C. while avoiding contact of the hot vapors with catalytic materials, and separating the products.

ANTHONY F. BENNING.
EDMOND G. YOUNG.

REFERENCES CITED

The following references are of record in the file of this patent:

UNITED STATES PATENTS

| Number | Name | Date |
|---|---|---|
| 2,494,064 | Simons et al. | Jan. 10, 1950 |
| 2,504,919 | Bordner | Apr. 18, 1950 |

OTHER REFERENCES

Ruff et al., "Zeit. Anorg. Chem.," vol. 201, pp. 256–7 (1931).